(12) United States Patent
Allen et al.

(10) Patent No.: US 9,868,660 B2
(45) Date of Patent: Jan. 16, 2018

(54) METHODS AND SYSTEMS FOR REDUCING BIOFOULING OF MICROFILTRATION MEMBRANES

(71) Applicant: Water Solutions, Inc., Sioux Falls, SD (US)

(72) Inventors: Stephen D. Allen, Eagle, ID (US); Edward Lewis, Sioux Falls, SD (US)

(73) Assignee: Water Solutions, Inc., Sioux Falls, SD (US)

(*) Notice: Subject to any disclaimer, the term of this patent is extended or adjusted under 35 U.S.C. 154(b) by 73 days.

(21) Appl. No.: 15/019,780

(22) Filed: Feb. 9, 2016

(65) Prior Publication Data

US 2016/0159674 A1   Jun. 9, 2016

Related U.S. Application Data

(63) Continuation-in-part of application No. 13/839,951, filed on Mar. 15, 2013, now Pat. No. 9,255,023.

(Continued)

(51) Int. Cl.
*C02F 9/00* (2006.01)
*C02F 1/44* (2006.01)
(Continued)

(52) U.S. Cl.
CPC .............. *C02F 9/00* (2013.01); *B01D 29/56* (2013.01); *B01D 65/08* (2013.01); *C02F 1/441* (2013.01);
(Continued)

(58) Field of Classification Search
CPC .... B01D 61/14; B01D 61/145; B01D 61/147; B01D 61/16; B01D 61/18; B01D 61/20; B01D 65/02; B01D 65/08; B01D 21/01; B01D 21/02; B01D 2311/04; B01D 2311/2642; B01D 2311/2646; B01D 29/56; B01D 37/03; B01D 39/1692; B01D 71/68; B01D 71/76; B01D 2257/00; B01D 36/008; B01D 33/35; B01D 33/41; B01D 61/142; B01D 61/022; B01D 61/025;
(Continued)

(56) References Cited

U.S. PATENT DOCUMENTS 4,036,749 A * 7/1977 Anderson ............ B01D 61/025
   203/7
5,670,435 A * 9/1997 Kajita ................... C02F 1/5236
   502/80

(Continued)

*Primary Examiner* — Joseph Drodge
(74) *Attorney, Agent, or Firm* — Kirton McConkie; Evan R. Witt

(57) ABSTRACT

Systems and methods for reducing biofouling of microfiltration membranes that are biofouled with biological substances are disclosed. The methods include providing impound water containing biomolecule-based exopolymeric substances, reacting with calcium oxide or calcium hydroxide, encapsulating the exopolymeric substance into filterable non-tacky particles by reacting with an inorganic coagulant and a low molecular weight polymer, and microfiltering to remove the filterable non-tacky particles encapsulating the exopolymeric substances. The filterable non-tacky particles encapsulate the exopolymeric substances and prevent the exopolymeric substances from biofouling the microfiltration membranes.

14 Claims, 1 Drawing Sheet

Related U.S. Application Data

(60) Provisional application No. 61/625,416, filed on Apr. 17, 2012.

(51) Int. Cl.

| | | |
|---|---|---|
| *C02F 1/52* | (2006.01) | |
| *C02F 1/66* | (2006.01) | |
| *B01D 65/08* | (2006.01) | |
| *C02F 5/10* | (2006.01) | |
| *B01D 29/56* | (2006.01) | |
| *C02F 1/56* | (2006.01) | |
| *C02F 1/72* | (2006.01) | |
| *C02F 101/00* | (2006.01) | |
| *C02F 101/10* | (2006.01) | |
| *C02F 103/00* | (2006.01) | |
| *C02F 103/10* | (2006.01) | |

(52) U.S. Cl.
CPC .......... *C02F 1/444* (2013.01); *C02F 1/5236* (2013.01); *C02F 1/5245* (2013.01); *C02F 1/56* (2013.01); *C02F 1/66* (2013.01); *C02F 1/725* (2013.01); *C02F 2101/006* (2013.01); *C02F 2101/103* (2013.01); *C02F 2101/106* (2013.01); *C02F 2103/007* (2013.01); *C02F 2103/10* (2013.01); *C02F 2303/20* (2013.01)

(58) Field of Classification Search
CPC ........ B01D 61/04; B01D 61/02; B01D 61/12; B01D 61/58; C02F 1/44; C02F 1/441; C02F 1/444; C02F 1/50; C02F 1/505; C02F 1/52; C02F 1/5209; C02F 1/5236; C02F 1/5245; C02F 1/5272; C02F 5/08; C02F 5/083; C02F 5/10; C02F 5/105; C02F 5/12; C02F 5/125; C02F 2101/30; C02F 2103/20; C02F 2103/22; C02F 9/00; C02F 1/66; C02F 1/725; C02F 2103/007; C02F 2101/106; C02F 2103/10; C02F 2101/103; C02F 2101/006; C02F 1/56; C02F 2303/20; C02F 1/64; C02F 1/72; C02F 1/78; C02F 2001/46; C02F 2101/203; C02F 2101/16; C02F 2201/007; C02F 2209/06; C02F 2305/023; C02F 2305/026
USPC ........ 210/200–203, 259, 321.6, 321.69, 513, 210/636, 638, 639, 650, 651, 710, 716, 210/717, 722–729, 732–736, 764
See application file for complete search history.

(56) References Cited

U.S. PATENT DOCUMENTS

| | | | | |
|---|---|---|---|---|
| 6,110,374 A | * | 8/2000 | Hughes | B01D 39/16 210/638 |
| 6,428,705 B1 | * | 8/2002 | Allen | B01D 61/16 210/638 |
| 8,349,188 B2 | * | 1/2013 | Soane | C02F 1/54 210/666 |
| 8,889,008 B2 | * | 11/2014 | Musale | B01D 61/025 210/644 |
| 9,255,023 B2 | * | 2/2016 | Allen | C02F 9/00 |
| 2002/0074295 A1 | * | 6/2002 | Cohen | C02F 1/56 210/723 |
| 2004/0129639 A1 | * | 7/2004 | Allen | C02F 1/444 210/650 |
| 2010/0206809 A1 | * | 8/2010 | Ikuno | B01D 61/08 210/638 |
| 2011/0042320 A1 | * | 2/2011 | Allen | C02F 1/001 210/724 |
| 2012/0267315 A1 | * | 10/2012 | Soane | C02F 1/5236 210/714 |
| 2013/0270189 A1 | * | 10/2013 | Allen | C02F 9/00 210/652 |

* cited by examiner

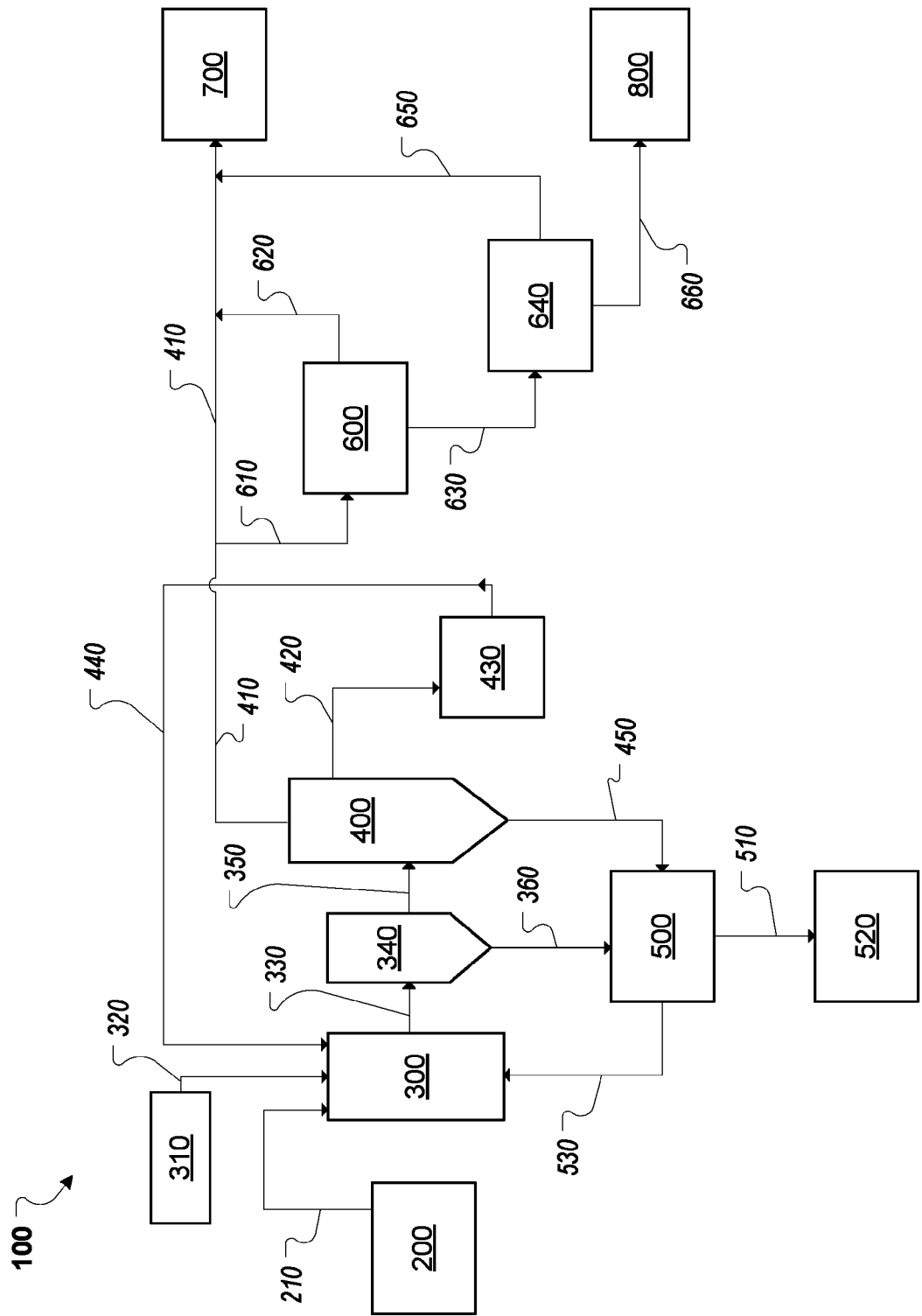

METHODS AND SYSTEMS FOR REDUCING BIOFOULING OF MICROFILTRATION MEMBRANES

CROSS-REFERENCE TO RELATED APPLICATIONS

This application is a continuation in part of U.S. patent application Ser. No. 13/839,951 filed Mar. 15, 2013, titled Treatment of Contaminated Impound Water, now issued as U.S. Pat. No. 9,255,023, which claims the benefit of U.S. Provisional Patent Application No. 61/625,416 filed Apr. 17, 2012, titled Treatment of Contaminated Impound Water. The disclosure of each of the applications to which the present application claims priority are incorporated by reference.

FIELD

The present disclosure relates to reducing biofouling of microfiltration membranes that are biofouled with biological substances. The present disclosure may be applied to reducing biofouling of microfiltration membranes that are biofouled with a biomolecule-based exopolymeric substance contained in agricultural impound water.

BACKGROUND

Impound water comprises drainage water or runoff water from any number of activities including agricultural activities. Impound water contains any number of contaminants including total dissolved solids, total suspended solids, settleable solids, organic compounds, minerals, heavy metals, and biological substances. Biological substances can include biological organisms, microorganisms, viruses, and the substances that they produce or secrete such as exopolymeric substance. Exopolymeric substance includes extracellular polysaccharides, lipopolysaccharides, glycolipids, lipids, humic substances, proteins, peptides, and nucleic acids and can form a sticky substance that fouls filtration membranes used in impound water treatment. Agricultural impound water that contains soil amendments tends to have higher concentrations of exopolymeric substance leading to increased biofouling of microfiltration membranes during treatment of the impound water.

While some conventional methods have been developed to treat agricultural impound water, these conventional methods are ineffective in removing exopolymeric substance. The exopolymeric substance consequently fouls microfiltration membranes and leads to increased back pressures and lowered flow rates across the microfiltration membranes. In some cases, biofouling of the microfiltration membrane continues until microfiltration is completely impeded.

Thus, while a variety of methods currently exist for treating agricultural impound water, challenges still exist, including those listed above. Accordingly, it would be an improvement in the art to provide methods and systems for reducing biofouling of microfiltration membranes that are biofouled with biological substances during treatment of agricultural impound water.

BRIEF SUMMARY

The present disclosure relates to reducing biofouling of microfiltration membranes during the treatment of contaminated impound water. In particular, the disclosure includes processes and systems for reducing biofouling of microfiltration membranes that are biofouled with a biomolecule-based exopolymeric substance contained in agricultural impound water. In some embodiments, the methods include reducing biofouling of microfiltration membranes by a biomolecule-based exopolymeric substance by providing agricultural impound water comprising a biomolecule-based exopolymeric substance, reacting the agricultural impound water with calcium oxide or calcium hydroxide to generate a calcium-treated biomolecule-based exopolymeric substance mixture, encapsulating the biomolecule-based exopolymeric substance into filterable, non-tacky particles by reacting the calcium-treated biomolecule-based exopolymeric substance mixture with an aluminum-based inorganic coagulant and a low molecular weight cationic polymer, removing a first portion of the encapsulated biomolecule-based exopolymeric substance as bulk solid, and removing a second portion of the encapsulated biomolecule-based exopolymeric substance by low pressure microfiltration through a microfiltration membrane comprising a pore size of between about 0.7 to 12 microns, where encapsulating the biomolecule-based exopolymeric substance into filterable, non-tacky particles reduces biofouling of the microfiltration membrane.

In some cases, the calcium oxide or calcium hydroxide can be reacted at a final concentration of between about 100 mg/L to 225 mg/L. In other cases, the inorganic coagulant comprises aluminum chlorohydrate and can be reacted at a final concentration of about 25 mg/L to 75 mg/L. In yet other cases, the low molecular weight polymer comprises epi-dma (poly(epichlorhydrin-dimethylamine). In some instances, the inorganic coagulant and low molecular weight polymer can be reacted with the calcium-treated biomolecule-based exopolymeric substance mixture at a ratio of about 2.5:1 to 10:1. In other instances, the microfilter membrane can comprise polypropylene, polysulfone, polyethylene, polytetrafluoroethylene, or combinations thereof. In yet other instances, the microfilter can comprise a pore size between about 1 to 2.5 microns. In other embodiments, the microfiltering further comprises microfiltering with a microfilter membrane at a back pressure of less than about 15 pounds per square inch and at a flow rate of at least 650 gallons per square foot of microfilter membrane per day and periodically backwashing the microfilter membrane to remove collected filterable non-tacky particles.

In some embodiments, the methods include a method for removing biomolecule-based exopolymeric substance from an aqueous mixture by providing an aqueous mixture containing exopolymeric substance and one or more of dissolved solids, suspended solids or heavy metals, reacting the aqueous mixture with calcium oxide or calcium hydroxide to generate a calcium-treated mixture, encapsulating the polysaccharide-based exopolymeric substance into filterable, non-tacky particles by reacting the calcium-treated mixture with aluminum chlorohydrate and epi-dma (poly(epichlorhydrin-dimethylamine), mechanically removing a first portion of the encapsulated polysaccharide-based exopolymeric substance as bulk solid; and microfiltering to remove a second portion of the encapsulated polysaccharide-based exopolymeric substance. In some cases, microfiltering further comprises microfiltering with a microfilter membrane at a back pressure of less than about 15 pounds per square inch and at a flow rate of at least 650 gallons per square foot of microfilter membrane per day and periodically backwashing the microfilter membrane to remove collected filterable non-tacky particles. In other cases, the microfilter membrane can comprise polypropylene, polysulfone, polyethylene, polytetrafluoroethylene, or combinations thereof. In yet other cases, the microfilter membrane can comprise a pore size between about 0.7 and about 12 microns. In some instances, the microfilter can comprise a pore size between about 1 to 2.5 microns.

In some embodiments, the methods and systems include a system for removing biomolecule-based exopolymeric substance from impound water comprising influent impound water containing biological substance and one or more of dissolved solids, suspended solids or heavy metals, a chemical treatment system configured to first react calcium oxide or calcium hydroxide with the impound water and then react with aluminum chlorohydrate and epi-dma (poly(epichlorhydrin-dimethylamine) to encapsulate the biological substance into filterable non-tacky particles a clarifier configured to remove a first portion of the encapsulated biological substance as bulk solid, and a microfiltration system configured to remove a second portion of the filterable non-tacky particles with a microfiltration membrane. In other embodiments, the microfiltration system is configured to remove a second portion of the filterable non-tacky particles at a back pressure of less than about 15 pounds per square inch and at a flow rate of at least 650 gallons per square foot of microfilter membrane per day. In yet other embodiments, the microfiltration system is configured to periodically backwash the microfilter membrane to remove collected flocculent particles. In some cases, the biological substance can comprises one or more of exopolymeric substance and fecal coliform bacteria. In other cases, the system further comprises a reverse osmosis system configured to further remove one or more of total dissolved solids and metal ions. In yet other cases, the microfilter membrane comprises a pore size between about 0.7 and about 12 microns.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 illustrates systems and methods for treating impound water contaminated with exopolymeric substance.

DETAILED DESCRIPTION

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Furthermore, the described features, structures, or characteristics of the disclosure may be combined in any suitable manner in one or more embodiments. In the following description, numerous specific details are provided, such as examples of suitable inorganic coagulants, low molecular weight polymers, chemical concentrations, oxidation chemicals and techniques, pH ranges, solid separation and microfiltration methods, reverse osmosis processes, etc., to provide a thorough understanding of embodiments of the disclosure. One having ordinary skill in the relevant art will recognize, however, that the disclosure may be practiced without one or more of the specific details, or with other methods, components, systems, materials, and so forth. In other instances, well-known structures, materials, or operations are not shown or described in detail to avoid obscuring aspects of the disclosure.

The present application relates to methods and systems for reducing biofouling of microfiltration membranes. In some embodiments, the present application includes methods, processes, and systems for pretreating impound water prior to microfiltration to reduce biofouling of the microfiltration membrane. In other embodiments, the present application includes methods, processes, and systems for reducing biofouling of a microfiltration membrane during treatment of impound water. In yet other embodiments, the impound water is pretreated by chemical treatment prior to microfiltration. The chemical treatment can comprise one or more of treatment with one or more additives, pH adjustment, treatment with a coagulant, and treatment with a polymer. The additive can include one or more of ferric chloride, ferrous chloride, calcium oxide, calcium hydroxide, and any other similar additive. The coagulant can include an inorganic coagulant, such as an aluminum chlorohydrate-type coagulant. The polymer can comprise a low molecular polymer (e.g., a polymer in the 200,000 to 800,000 molecular weight range). In some cases, the polymer comprises a quaternized low molecular weight cationic polymer. In other cases, the polymer comprises a potable grade polymer. Non-limiting examples of suitable low molecular weight polymers include epi-dma and DADMAC polymers. In some instances, the chemical treatment can generate filterable non-tacky particles that encapsulate biofouling biological substances. In other instances, the chemical treatment can generate filterable non-tacky particles that encapsulate one or more of metal ion species, organic species, and biological substances (e.g., exopolymeric substance, microorganisms, virus, and other similar substances).

In some embodiments, impound water comprises water containing biological contaminants that can produce biological fouling of microfiltration membranes may include, but is not limited to, water impounded from one or more of agricultural activities including agricultural run-off (e.g., agricultural impound water), reverse osmosis treatment facilities, hydraulic fracturing (frac'ing) effluent of gas wells, post anaerobic digested sludge effluent waste water, and wastewater produced in ethanol fermentation processes. In other embodiments, impound water comprises water that undergoes treatment to render it canal grade water. For example, agricultural impound water can include impound water from the Tulare Lake Drainage District (TLDD) in Corcoran, Calif.

In some embodiments, the impound water can contain a number of different contaminants including total dissolved solids, total suspended solids, settleable solids, organic compounds, minerals, heavy metals, and biological substances. In some cases, total dissolved solids can include all inorganic and organic substances contained in the impound water in a molecular, ionized, and/or microgranular dissolved form. In other cases, total dissolved solids can comprise solids that pass through a filter with a two micron nominal pore size. In yet other cases, total dissolved solids can comprise one or more chemical constituents such as cations, anions, calcium, sodium, potassium, phosphates, nitrates, and chloride. In some embodiments, total suspended solids include particles that cannot pass through a filter with a two micron nominal pore size. In other embodiments, total suspended solids include particles that do not settle out of a still fluid. In yet other embodiments, settleable solids include particles that settle out of a still fluid.

In some embodiments, organic compounds include any carbon-containing compound found in the impound water. Organic compounds can include pesticides and other related agricultural chemical compounds such as fertilizers. In other embodiments, minerals include total dissolved solids that result from the weathering and dissolutions of rocks and soils.

In some embodiments, heavy metals include toxic heavy metals and metalloids that are of environmental concern. For example, heavy metals can include, but are not limited to, selenium arsenic, uranium, cadmium, mercury, lead, and chromium. In other embodiments, heavy metals include selenium, arsenic, and uranium as free ions and constituents of organic species such as seleno-methionine, seleno-cysteine, and seleno-cystine. In some cases, heavy metals are present at levels above regulatory levels and must be removed at least in part before the treated impound water can be discharged as canal water.

In some embodiments, biological substances comprise one or more of biological organisms, microorganisms (e.g., bacteria, plankton, algae, protozoa, prokaryotes, archaea, and diatoms), and viruses present in impound water. Biological substances can also include molecules and/or other substances produced by and/or excreted by one or more of biological organisms, microorganisms (e.g., bacteria, plankton, algae, protozoa, prokaryotes, archaea, and diatoms), and viruses present in impound water.

In some embodiments, biological substances include biomolecule-based exopolymeric substance and/or extracellular polymeric substance (EPS). EPS can comprise biopolymers produced and/or secreted by microorganisms. In other embodiments, EPS comprises biopolymers that are part of biofilms and/or biopolymers that are produced and/or secreted by microorganisms in response to environmental stress. EPS can comprise one or more macromolecules such as extracellular polysaccharides, lipopolysaccharides, glycolipids, lipids, humic substances, proteins, peptides, and nucleic acids. In yet other embodiments, EPS comprises exopolysaccharides that include high molecular weight polymers comprising sugar residues (e.g., monosaccharides) and other non-carbohydrate components (e.g., acetate, pyruvate, succinate, and phosphate).

In some embodiments, EPS comprises a sticky substance that adheres to filter membranes. In some cases, EPS comprises a yellowish/brownish substance. In other embodiments, EPS reduces filterability and/or reduces filter flow rates during treatment of contaminated impound water. In some cases, the presence of EPS in impound water can substantially reduce the flow rate and/or can increase backpressure during microfiltration. The presence of EPS can also lead to biofouling of the microfiltration membranes. In other embodiments, EPS present in the contaminated impound water likely results from the agricultural use of soil amendments comprising biosolids. In some cases, the process of producing biosolids for soil amendments involves anaerobic digestion of activated sludge by microorganisms. During anaerobic digestion, the microorganisms likely produce EPS that forms part of the resulting soil amendments and that eventually makes its way into the contaminated impound water. In yet other embodiments, the EPS content of impound water varies based on the seasonal use of soil amendments (e.g., higher EPS content during and/or after growing season in which soil amendments are employed and lower EPS content during times when no soil amendments are used).

In some embodiments, biological substances include bacteria such as fecal coliform bacteria. Fecal coliform bacteria can include bacteria that originate in feces (e.g., *Escherichia*) and those not of fecal origin (e.g., *Enterobacter, Klebsiella*, and *Citrobacter*). Fecal coliform bacteria can include coliform types of bacteria that originate in the intestines of warm-blooded animals. Fecal coliform can include rod-shaped Gram-negative non-spore forming bacteria. In other embodiments, the presence of fecal coliform bacteria indicates an increased risk of waterborne gastroenteritis.

In general (and as mentioned above), some embodiments of the described systems and methods relate to reducing biofouling of microfiltration membranes. While the described systems and methods can comprise any suitable component or characteristic, FIG. 1 shows that, in at least some embodiments, a system 100 comprises one or more of influent impound water 200, a chemical treatment system 300, a microfiltration system 400, a solids separation system 500, a reverse osmosis (RO or R/O) system 600, a discharge to canal system 700, and a RO reject system 800. With respect to system 100, although FIG. 1 shows influent impound water 200, a chemical treatment system 300, a microfiltration system 400, a solids separation system 500, a reverse osmosis (RO or R/O) system 600, a discharge to canal system 700, and a RO reject system 800 arranged in a particular flow path and/or step-wise order, the described systems can be arranged in any other suitable flow path and/or any other step-wise order. Likewise, system 100 can be configured with fewer systems than described and/or additional systems to those described.

With respect to influent water 200, in some embodiments, influent impound water 200 comprises impound water as described above. In some cases, influent impound water 200 comprises one or more of the constituents (e.g., total dissolved solids, total suspended solids, settleable solids, organic compounds, minerals, heavy metals, and biological substances) as described above. In other cases, influent impound water 200 comprises an aqueous mixture with one or more of the constituents (e.g., total dissolved solids, total suspended solids, settleable solids, organic compounds, minerals, heavy metals, and biological substances) as described above. The influent impound water 200 can be transferred directly from an impound water source to the system 100 or can be transferred to a holding tank or reservoir until it is ready for treatment in system 100. The influent impound water 200 can be transferred to the chemical treatment system 300 via line 210. In some cases, the influent impound water 200 can be transferred to the chemical treatment system 300 via line 210 by passing through an influent screen and/or a pre-filter.

With respect to chemical treatment system 300, in some embodiments, the chemical treatment system 300 comprises one or more additions of chemical agents 310 via line 320, reactions with chemical agents 310, and pH adjustments to the influent impound water 200. In some cases, chemical agents 310 can include any suitable agent for treating influent impound water 200 including ferrous iron ions, ferric iron ions, calcium oxide, calcium hydroxide, magnesium oxide, magnesium hydroxide, inorganic coagulants, and low molecular weight polymers. In other cases, pH adjustments can be carried out by the addition of any suitable acid and/or base such as a strong acid (e.g., HCl, $HNO_3$ and $H_2SO_4$) and/or a strong base (e.g., NaOH and KOH). In other embodiments, the chemical agents 310 employed, the sequence of addition of chemical agents, the final concentration of the chemical agents 310, the time of reaction, the sequence of pH adjusting, and the ranges of the pH adjustment are configured to adequately treat influent impound water 200 while reducing biofouling of the microfiltration system 400.

In some embodiments, the chemical treatment system 300 comprises a step-wise reaction of the influent impound water 200 with calcium oxide followed by reaction with an inorganic coagulant followed by reaction with a low molecular weight polymer to encapsulate contaminants such as EPS and fecal coliforms into filterable non-tacky particles. While calcium oxide can be reacted with the influent impound water 200 at any suitable concentration, at least in some embodiments, calcium oxide is reacted with the influent impound water 200 at a range of about 100 mg/L to about 500 mg/L, and any subrange therein. In other embodiments, calcium oxide is reacted with the influent impound water 200 at a range of about 200 mg/L to about 400 mg/L and any subrange therein. In yet other embodiments, calcium oxide is reacted with the influent impound water 200 at about 225 mg/L. In some embodiment, calcium oxide is reacted with the influent impound water 200 at least about 100 mg/L, about 125 mg/L, about 150 mg/L, about 175 mg/L, about 200 mg/L, about 225 mg/L, about 250 mg/L, about 275 mg/L, about 300 mg/L, about 325 mg/L, about 350 mg/L, about 375 mg/L, about 400 mg/L, about 425 mg/L, about 450 mg/L, about 475 mg/L, or about 500 mg/L. In some embodiments, calcium hydroxide can be used in place of calcium oxide.

In some embodiments, the inorganic coagulant comprises any inorganic coagulant suitable for encapsulating contaminants such as EPS and/or fecal coliforms into filterable non-tacky particles. In other embodiments, inorganic coagulants can include aluminum chlorohydrate compounds having the general formula $Al_nCl_{(3n-m)}(OH)_m$. In some cases, aluminum chlorohydrate can include aluminum hydroxychloride, aluminum chlorohydroxide, aluminum chloride basic, aluminum chlorohydrol, and polyaluminum chloride. In yet other embodiments, the inorganic coagulants include, but are not limited to, one or more of aluminum sulfate ($Al_2(SO_4)_3$), aluminum chloride ($AlCl_3$), polyaluminum sulfate, sodium aluminate, ferric chloride ($FeCl_3$), ferric sulfate ($Fe_2(SO_4)_3$), and ferrous iron compounds, ferric iron compounds, ferrous chloride, ferrous sulfate, ferric chloride, ferric sulfate, ferric chloro sulfate, silicates, dithiocarbamate, and dithiocarbonic acid.

While the inorganic coagulant can be reacted at any suitable concentration, at least in some embodiments, inorganic coagulant is reacted at a range of about 5 mg/L to about 150 mg/L, and any subrange therein. In other embodiments, inorganic coagulant is reacted at a range of about 20 mg/L to about 80 mg/L and any subrange therein. In yet other embodiments, inorganic coagulant is reacted at about 25 mg/L to about 75 mg/L and any subrange therein. In some embodiment, inorganic coagulant is reacted at least about 10 mg/L, about 15 mg/L, about 20 mg/L, about 25 mg/L, about 30 mg/L, about 35 mg/L, about 40 mg/L, about 45 mg/L, about 50 mg/L, about 55 mg/L, about 60 mg/L, about 65 mg/L, about 70 mg/L, about 75 mg/L, about 80 mg/L, about 85 mg/L, about 90 mg/L, about 95 mg/L, about 100 mg/L, about 105 mg/L, about 110 mg/L, about 115 mg/L, about 120 mg/L, or about 125 mg/L.

In some embodiments, the low molecular weight polymer comprises an organic polymer with a molecular weight of about 200,000 to 800,000 Da. In some cases, the low molecular weight polymer can be a cationic polymer (e.g., a quaternized polymer). In other cases, the low molecular weight polymer can be a potable grade polymer. One non-limiting example of a suitable low molecular weight polymer is epi-dma, a condensation product of epichlorohydrin and dimethylamine having the general description:

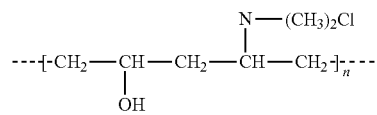

where the molecular weight is typically between 200,000 and 800,000 Da. In other embodiments, low molecular weight polymers include, but are not limited to, DADMAC, diallyldimethyl ammonium chloride, linear polyamines, and branched polyamines.

While the low molecular weight polymer can comprise any suitable molecular weight, at least in some embodiments, the low molecular weight polymer comprises a molecular weight of about 200,000 to about 800,000 Da and any subrange therein. In other embodiments, the molecular weight of the low molecular polymer can be tailored to the nature of the specific low molecular weight polymer and/or the nature of the contaminant(s) to be removed. For example, when using epi-dma to treat contaminated water comprising metal ions and other similar ions, an epi-dma of molecular weight about 240,000 to about 280,000 Da can be preferred. Likewise, when using epi-dma to treat contaminated water comprising organic contaminants, an epi-dma of molecular weight about 350,000 to about 400,000 Da can be preferred. When using DADMAC polymers, the preferred molecular weight range can be higher compared to the molecular weight range of epi-dma (e.g., a preferred range of about 450,000 to about 550,000 Da for DADMAC polymers). In yet other embodiments, the low molecular weight polymer comprises a molecular weight of about 200,000 to 400,000 Da and any subrange therein. In some cases, the low molecular weight polymer comprises a molecular weight of about 250,000 to 350,000 Da and any subrange therein.

While the low molecular weight polymer can be reacted at any suitable concentration, at least in some embodiments, inorganic coagulant is reacted at a range of about 0.3 mg/L to about 150 mg/L, and any subrange therein. In other embodiments, low molecular weight polymer is reacted at a range of about 1 mg/L to about 25 mg/L and any subrange therein. In yet other embodiments, low molecular weight polymer is reacted at about 1 mg/L to about 18 mg/L and any subrange therein. In some embodiment, inorganic coagulant is reacted at least about 1 mg/L, about 2 mg/L, about 3 mg/L, about 4 mg/L, about 5 mg/L, about 6 mg/L, about 7 mg/L, about 8 mg/L, about 9 mg/L, about 10 mg/L, about 11 mg/L, about 12 mg/L, about 13 mg/L, about 14 mg/L, about 15 mg/L, about 16 mg/L, about 17 mg/L, about 18 mg/L, about 19 mg/L, about 20 mg/L, about 21 mg/L, about 22 mg/L, about 23 mg/L, about 24 mg/L, or about 25 mg/L.

In some embodiments, the ratio of inorganic coagulant to low molecular weight polymer can be tailored to the nature of the specific inorganic coagulant and/or low molecular weight polymer and/or the nature of the contaminant(s) to be removed. For example, a ratio of inorganic coagulant to low molecular weight polymer may be in the range of 1:1 (inorganic coagulant to polymer) to 15:1 (inorganic coagulant to polymer). In other embodiments, the ratio of inorganic coagulant to low molecular weight polymer is in the range of 4:1 to 10:1. In yet other embodiments, the ratio of inorganic coagulant to low molecular weight polymer is in the range of 6:1 to 8:1 (inorganic coagulant to polymer). In some cases, the ratio of inorganic coagulant to low molecular weight polymer can be about 1:1, 2:1, 3:1, 4:1, 5:1, 6:1, 7:1, 8:1, 9:1, 10:1, 11:1, 12:1, 13:1, 14:1, or 15:1.

In some embodiments, the chemical treatment system 300 increases the physical size of contaminants and particles in the influent impound water 200 by encapsulating the contaminants and particles into filterable non-tacky particles. In other embodiments, the chemical treatment system 300 can increase the physical size of contaminants and particles in the influent impound water 200 to generate bulk solids and filterable non-tacky particles. In yet other embodiments, the chemical treatment system 300, encapsulates the contaminants and particles into filterable non-tacky particles with an average size of about 75 to about 80 microns with a 3 sigma (3σ) particle distribution at 25-120 microns in physical size. In some cases, the chemical treatment system 300, encapsulates the contaminants and particles into filterable non-tacky particles with an average size of about 10 to about 150 microns. In other cases, the chemical treatment system 300, encapsulates the contaminants and particles into filterable non-tacky particles with an average size of about 10, 20, 30, 40, 50, 60, 70, 80, 90, 100, 110, 120, 130, 140, or 150 microns.

In some embodiments, filterable non-tacky particles comprise one or more of low viscosity and low tackiness. In other embodiments, the filterable non-tacky particles are highly dewatered (e.g., less than 15% as bound water). In yet other embodiment, the filterable non-tacky particles are one or more of easily filtered by microfiltration, excluded from microfiltration membranes, easily backwashed from microfiltration membranes with relatively low pressure water, and not contribute to biofouling of microfiltration membranes. In some embodiments, the filterable non-tacky particles are configured to encapsulate one or more of total dissolved solids, total suspended solids, settleable solids, organic compounds, minerals, heavy metals, and biological substances (e.g., EPS and fecal coliforms). In other embodiments, the identity, concentration, and reaction time of the chemical agents 310 are varied to generate filterable non-tacky particles of a desired size, filterability, and/or non-tackiness. In yet other embodiments, the identity, concentration, and reaction time of the chemical agents 310 are varied to generate filterable non-tacky particles that are of sufficient size to not pass through a microfiltration membrane.

With continued reference to FIG. 1, at least in some embodiments, chemically treated impound water is transferred via line 330 to a clarifier 340. While the clarifier 340 can be configured in any suitable manner, in some embodiments, the clarifier 340 is configured to separate bulk solids from filterable non-tacky particles. For example, the clarifier 340 can be configured to separate bulk solids from filterable non-tacky particles by settling. Filterable non-tacky particles can be transferred via line 350 to the microfiltration system 400 and bulk solids can be transferred via line 360 to the solids separation system 500. In other embodiments, a clarifier is not used and the chemically treated impound water is transferred directly to the microfiltration system 400.

Additionally, FIG. 1 shows that, in some embodiments, the system 100 comprises a microfiltration system 400 configured to microfilter the chemically treated impound water. In other embodiments, the microfiltration system 400 is configured to microfilter filterable non-tacky particles from the chemically treated impound water to generate a microfiltered effluent. While the microfiltration system 400 can be configured in any suitable manner to microfilter the chemically treated impound water, at least in some embodiments, it comprises a low pressure deadhead microfiltration unit equipped with microfiltration membranes configured to microfilter filterable non-tacky particles from the chemically treated impound water to generate a microfiltered effluent and to allow for low pressure back flushing of the microfiltration membranes. For example, the microfiltration unit can operate at a pressure range of about 5 to about 15 pounds per square inch (PSI). In some cases, the microfiltration unit can operate at a pressure range of about 1 to about 30 PSI and any subrange therein. In other cases, the microfiltration unit can operate at a pressure range of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 PSI.

In some cases, the low tackiness, low viscosity, and highly dewatered nature of the filterable non-tacky particles allows for the particles to be excluded by the membrane and to be back flushed from the membrane at relatively low pressure. In some cases, the microfiltration system 400 can comprise more than one low pressure deadhead microfiltration unit. In other cases, the more than one low pressure deadhead microfiltration units can be configured in parallel or in series.

In some embodiments, the low filtration pressure of the microfiltration system 400 allows for the filterable non-tacky particles to be excluded by the microfiltration membrane. In other embodiments, a backwash or back flush procedure comprises halting flow of the chemically treated impound water, allowing the microfiltration membrane to rest for a predetermined amount of time (e.g., one minute), opening an effluent stream valve to allow backwash liquid (e.g., microfiltered effluent 410) to flow in a reverse direction across the microfiltration membrane to backflush the excluded filterable non-tacky particles (e.g., particles greater than 2.2 microns in physical size), provide time (e.g., approximately 1 to 2 minutes) for the particles to settle, removing 450 the excluded filterable non-tacky particles from the backwash of the microfiltration membranes, and reestablishing flow of the chemically treated impound water. In some cases, variations in resting time, backflush time, and/or settling time can be varied based on the characteristics of the filterable non-tacky particles. In other cases, variations in resting time, backflush time, and/or settling time can be varied based on the characteristics of the contaminants found in the impound water. In other cases, the back flush liquid 430 can be removed via line 420 and transferred via line 440 to the chemical treatment system 300.

With respect to the microfiltration membranes, in some embodiments, the microfiltration membranes comprise any suitable microfiltration membrane configured to exclude the filterable non-tacky particles. In some cases, the microfiltration membrane is configured to operate at least at a pressure range of about 5 to about 15 PSI. In other cases, the microfiltration membrane can comprise any suitable material including, but not limited to, polypropylene, polyethylene, polytetrafluoroethylene (PTFE), and polysulfone membranes. Other commercially available microfiltration membranes can also be used, including membranes specifically designed for high salt concentrations, high heat, or high pressure (greater than the 5-15 PSI noted above). In other embodiments, the microfiltration membrane is configured for high flow at low pressure across the membrane. For example, the microfiltration membrane can be configured to perform at a flow rate of about 500 to about 1,100 gallon per square feet of membrane per day (GFD) and any subrange therein. In some cases, the microfiltration membrane can be configured to perform at a flow rate of about 500, 550, 650, 700, 750, 800, 850, 900, 950, 1000, 1050, 1100, 1150, or 1200 GFD. In yet other embodiments, the microfiltration membranes are configured with a nominal pore size of about 0.1 to about 15 microns or any subrange therein. In some cases, the microfiltration membranes are configured with a nominal pore size of about 1.0 microns with about 2.2 micron absolute passage of particulate (meaning that greater than 99.7% of all particles are excluded by the membrane). In other cases, the microfiltration membranes are configured with a nominal pore size of about 0.1, 0.2, 0.3, 0.4, 0.5, 0.6, 0.7, 0.8, 0.9, 1, 2, 3, 4, 5, 6, 7, 8, 9, 10, 11, 12, 13, 14, or 15 microns.

In some embodiments, the solids separation system 500 is configured to dewater bulk solids. In other embodiments, the separation system 500 is configured to dewater bulk solids received from the clarifier 340 and the microfiltration system 400. While the solids separation system 500 can comprise any suitable dewatering methods, in some embodiments, it comprises settling, filter press, centrifuge, belt press, and combinations thereof. The dewatered bulk solids 520 can be removed via line 510 for further processing and/or disposal. Any liquids recovered from the dewatered bulk solids can be returned to the chemical treatment system 300 via line 530.

In some embodiments, the reverse osmosis system 600 is configured to perform reverse osmosis treatment of chemically treated impound water and/or microfiltered effluent 410. While the reverse osmosis system 600 can comprise any suitable component or characteristic, at least in some embodiments, the reverse osmosis system 600 is configured with a primary reverse osmosis unit and a recovery reverse osmosis unit 640. While in some cases the microfilter effluent 410 can be canal grade quality water and can be discharged to the canal system 700, in other cases the microfilter effluent requires further treatment such as RO treatment to be considered canal grade quality water. Therefore, in some embodiments, at least part of the microfilter effluent 410 is transferred to the primary reverse osmosis unit of the reverse osmosis system 600 (via line 610) for RO treatment. In some cases, the microfilter effluent 410 can be RO treated with little or no corrosion and little or no scaling of the membranes at a higher level of permeate (e.g., 75% to 80% permeate). All or part of primary RO permeate 620 can then be transferred for discharge to the canal system 700. All or part of the primary RO retentate 630 can then be transferred for further RO treatment in the recovery reverse osmosis unit 640. After treatment by the recovery reverse osmosis unit 640, all or part of recovery RO permeate 650 (e.g., about 50% to about 60%) can be discharged to the canal system 700 while all or part of recovery RO retentate 660 can be transferred for further treatment with the RO reject system 800.

In some embodiments, the canal system 700 comprises any suitable human-made channel configured to transport water. In some cases, canal grade water can comprise treated water that is at or below the California Title 22 and 17 recycle program for inclusion into canals in California. In other cases, canal grade water can comprise treated water that is at or below regulatory standards for one or more of total dissolved solids, total suspended solids, settleable solids, organic compounds, minerals, heavy metals, and biological substances.

While the RO reject system 800 can comprise any suitable component, at least in some embodiments, the RO reject system 800 comprises one or more of a segregated evaporation basin and a thermal distillation unit. For example, the RO reject system 800 can comprise a segregated evaporation basin configured to further process the recovery RO retentate 660 to allow any remaining water to evaporate and any remaining contaminants such as TDS to remain in the evaporation basin. In some cases, the RO reject system 800 can include a nano-filtration system to remove ion species from the RO retentate 660. In some cases, the RO reject system 800 can comprise a thermal distillation unit configured to thermally distill the recovery RO retentate 660 to recover distilled water and semi-solid or solid contaminants. The distilled water can be discharged to the canal system 700 and the semi-solid or solid contaminants can be disposed or sold as commodities. In other embodiments, the system 100 is configured as a zero liquid discharge (ZLD) system that eliminates final wastewater discharge by treating the influent impound water 200 to such a degree that only canal grade water and solid or semi-solid contaminants are generated. The zero liquid discharge system can employ a nano-filtration or a thermal distillation unit as a latter step to recover filtered or distilled water and semi-solid or solid contaminants from the recovery RO retentate 660 and reduce the generation of final wastewater discharge.

In some embodiments, system 100 comprises any suitable analytical testing, analytical sampling, or characterization of the influent impound water 200, any intermediary influent or effluent generated by the system 100, or any contaminant removed from the system. In other embodiments, the order of any systems used within system 100, the identity of chemical agents 310, the concentrations of the chemical agents 310, the time of reaction of the chemical agents 310, back flushing procedure, and/or reverse osmosis procedure is modified based on analytical testing, analytical sampling, or characterization of the influent impound water 200, any intermediary influent or effluent generated by the system 100, or any contaminant removed from the system. For example, in some embodiments, the microfilter effluent 410 is analyzed to determine if it meets the requirements to be considered canal grade water. If the microfilter effluent 410 meets the requirements to be considered canal grade water then the reverse osmosis system 600 can be bypassed and the canal grade microfilter effluent 410 can be discharged to the canal system 700. If the microfilter effluent does not meet the requirements to be considered canal grade water, then it can be further treated by the reverse osmosis system 600. In another example, the influent impound water 200 can be tested for the presence of EPS. If EPS is detected above a threshold amount, then the system 100 can be configured to treat the influent impound water 200 with calcium oxide as described above followed by treatment with an inorganic coagulant and a low molecular weight polymer in the chemical treatment system 300. If EPS is not detected, then the influent impound water 200 can be treated only with inorganic coagulant and low molecular weight polymer in the chemical treatment system 300.

In some embodiments, analytical testing, analytical sampling, or characterization of the influent impound water 200, any intermediary influent or effluent generated by the system 100, or any contaminant removed by the system 100 is carried out at any suitable step of the system 100. For example, analytical testing can be carried out before, during, and/or after providing the influent impound water 200, chemical treatment by the chemical treatment system 300, clarifying with the clarifier 340, microfiltration by the microfiltration system 400, separation by the solids separation system, treatment by the reverse osmosis system 600, discharge to the canal system 700, and processing by the RO reject system 800.

In some embodiments, analytical testing, analytical sampling, or characterization includes, but is not limited to, any of the analytical methods, assays, and/or tests described in the EXAMPLES listed below. These analytical methods, assays, and/or tests can include, but are not limited to, determining and/or monitoring pH, determining and/or monitoring for microorganisms using aerobic plate count, determining and/or monitoring for fecal coliforms using most probable number (MPN), determining and/or monitoring total organic carbon (TOC), determining and/or monitoring turbidity (e.g., as measured by nephelometric turbidity units (NTU)), determining and/or monitoring conductivity, determining and/or monitoring total dissolved solids (TDS), determining and/or monitoring for the presence of and/or levels of metal ions (e.g., arsenic, selenium, uranium, barium, cadmium, chromium, lead, mercury, silver). The analytical methods, assays, and/or tests can include toxic characteristic leaching procedure (TLCP) of semi-solid and/or solid bulk waste to test for the presence of contaminants such as arsenic, barium, cadmium, chromium, lead, mercury, selenium, and silver. The analytical methods, assays, and/or tests can also include scanning electron microscope (SEM) analysis and energy-dispersive X-ray spectroscopy (EDS) of microfiltration membranes to identify contaminants that adhere to the microfiltration membranes.

The following examples and experimental results are given to illustrate various embodiments within the scope of the present disclosure. These are given by way of example only, and it is understood that the following examples are not comprehensive or exhaustive of the many types of embodiments of the present disclosure that can be prepared in accordance with the present disclosure.

Example 1

A study was carried out near Corcoran, Calif. at the Tulare Lake Drainage District. The purpose of the study was to treat agricultural impound water to meet or exceed then existing regulatory standards. Another purpose of the study was to validate scaling of the process to treat approximately 13.4 million gallons of contaminated water per day (MGD) to yield approximately 11.5 MGD of treated water. The study employed chemical pretreatment to generate filterable particles followed by mechanical separation with microfilter membranes to remove the filterable particles. The microfiltered effluent was then subjected to reverse osmosis filtration. Contaminants that were targeted for removal included metals such as arsenic, selenium, and uranium. Other goals of the treatment processes included reduction of sulfate levels, reduction and possible elimination of bacteria, and substantial reduction in influent organic loadings, heavy metals, chemicals, and biologicals.

Materials included microfilter membranes comprised of polypropylene. The microfilter membranes comprised a pore size of 1.0 μm with 3 σ on pore sizing of 2.1 μm (Signifying that 99.7% of all particles larger than 2.1 μm would be rejected from the microfilter membrane or held up on the surface of the microfilter membrane). The chemical treatment included treatment with aluminum based polymers such as aluminum chlorohydrate, iron based materials such as ferric and ferrous compounds, and zero valence iron. Additional chemicals such as calcium oxide (lime) and magnesium hydroxide, $Mg(OH)_2$) were used.

Samples of the influent impound water were chemically treated and subjected to microfiltration on-site. A yellowish/brownish substance was recovered on the microfiltration membranes. It was suspected that this yellowish/brownish substance reduced the efficiency of the microfiltration step. Chemical treatment was repeated on additional samples of the impound water and the chemically-treated sample was filtered with 1.0 μm gas chromatographic membranes (Acrodisc glass fiber membranes, Pall Corporation) to determine simulated flow rates through the polypropylene microfiltration membranes. The simulated flow rates were found to be substantially lowered and the same yellowish/brownish substance was observed on the Acrodisc glass fiber membranes. It was determined that the yellowish/brownish substance was exopolymeric substance (EPS). The reduction in simulated flow rates and presence of EPS on the microfiltration membranes indicated a strong likelihood that bonding of EPS to the microfiltration membranes caused biofouling of the microfiltration membranes that reduced flow rates.

Samples of the influent impound water, microfiltered water, and reverse osmosis (RO or R/O) permeate were tested for biological content. The samples were tested to determine the total plate count (TPC) and also for fecal coliform microorganisms. The results are illustrated in Table 1.

TABLE 1

| Sample source | Aerobic Plate Count CFU (Colony Forming Units/mL) | Fecal Coliforms MPN (Most Probable Number/mL) | Total Organic Carbon (TOC) (mg/L) |
|---|---|---|---|
| Influent | 970,000 | 110 | 43 |
| Post microfilter | 260,000 | <2 | 33 |
| RO permeate | 300 | <2 | 25 |

Based on Table 1, it was determined that the total plate counts and fecal coliforms were reduced to manageable levels by the study treatment processes. It was possible to further treat the R/O permeate with a minor amount of disinfection to meet the bacterial counts as required for potable water. Table 1 also shows similar reductions in TOC levels upon microfiltration and treatment by reverse osmosis. Not all of the CFU values were as high as those indicated in Table 1. The presence of biological content in the influent wastewater indicated that treatment of the biological content was to be another objective of the study.

A series of test runs were performed to treat the influent water for EPS and for biological content. In general, in each of the tests, some variation of the following procedure was followed: First, ferrous chloride ($FeCl_2$) was added to the influent water sample. Next, either calcium oxide (lime) or magnesium hydroxide ($Mg(OH)_2$) was added. Then, aluminum chlorohydrate was added to the sample followed by an organic synthetic cationic such as epi-dma. Finally, the resulting filterable particles were removed by filtering on the microfiltration membranes followed by reverse osmosis treatment. Both calcium oxide and magnesium hydroxide reacted well, but calcium oxide resulted in better flow rates across the microfiltration membrane. Calcium oxide was preferred in further testing.

In each test run the levels of metals were monitored, including levels of arsenic, selenium, and uranium. Additionally, nephelometric turbidity units (NTU), total dissolved solids (TDS), and conductivity (μS/m) were monitored as measures of reaction rates and as measures of elimination of total soluble solids (TSS), total solids (TS), and organics (including biologicals). Influent waste water was assayed for each test and resulted in a mean TDS value of 11,585 mg/L (range: 7,930-18,500 mg/L, n=12) and a mean pH value of 8.19 (range: 7.82-8.50, n=12).

Results for a first test run are illustrated in Table 2.

TABLE 2

| Parameter | Influent | Post microfiltration | R/O permeate |
|---|---|---|---|
| Arsenic (As) (μg/L) | 130 | <20 | <10 |
| Selenium (Se) (μg/L) | 50 | <20 | <10 |
| Uranium (U) (μg/L) | 610 | 350 | <20 |
| Total dissolved solids (TDS) (mg/L) | 9,180 | 6,810 | 182 |
| Total organic carbon (TOC) (mg/L) | 43 | 33 | 25 |
| pH | 8.07 | 8.54 | 8.47 |

A second test was carried out. Results are illustrated in Table 3.

TABLE 3

| Parameter | Influent | Post microfiltration | R/O permeate |
|---|---|---|---|
| Arsenic (As) (μg/L) | 110 | 40 | <10 |
| Selenium (Se) (μg/L) | <20 | <20 | <20 |
| Uranium (U) (μg/L) | 430 | 420 | <20 |
| Total dissolved solids (TDS) (mg/L) | 11,434 | 9,070 | 396 |
| Total organic carbon (TOC) (mg/L) | 13 | 10.6 | 1.2 |
| pH | 8.34 | 8.44 | 8.25 |

The influent from the second test had a TDS level of 11,434 mg/L. The values for arsenic, selenium, and uranium were all lower in the influent from the second test. The pH was higher and NTU was higher in the influent from the second test run. $HCO_3^-$ and $CO_3^{-2}$ were also detected in the second test run.

The filtered solids from the test runs were analyzed and the results are illustrated in Tables 4-5. Table 4 reports the values from the filtered solids after processing through filter press with the solids in wet form. Table 5 reports the values from the filtered solids after processing through filter press with the solids in semi-dried form.

TABLE 4

| Parameter | Value |
|---|---|
| Arsenic (As) (mg/kg) | 53 |
| Selenium (Se) (mg/kg) | <1.0 |
| Uranium (U) (mg/kg) | 108 |
| Total solids (by % weight) | 43.8 |

TABLE 5

| Parameter | Value |
|---|---|
| Arsenic (As) (mg/kg) | 57.3 |
| Selenium (Se) (mg/kg) | <1.0 |
| Uranium (U) (mg/kg) | 117 |
| Total solids (by % weight) | 51.9 |

The collected solids were also subjected to leachability testing. Leachability testing is a standard analysis performed to determine suitability for a waste material to be landfilled. The results are shown in Table 6. The results met and/or exceeded all TCLP (toxicity characteristic leaching procedure) parameters for landfill suitability.

TABLE 6

| TCLP Parameter | Collected solids |
|---|---|
| Arsenic (As) (mg/kg) | <1.4 |
| Barium (Ba) (mg/kg) | <1.2 |
| Cadmium (Cd) (mg/kg) | <0.19 |
| Chromium (Cr) (mg/kg) | <0.86 |
| Lead (Pb) (mg/kg) | <0.37 |
| Mercury (Hg) (mg/kg) | <0.02 |
| Selenium (Se) (mg/kg) | <0.16 |
| Silver (Ag) (mg/kg) | <0.3 |

After the test runs were completed, microfiltration membranes used in the test runs were analyzed by scanning electron microscopy (SEM) and energy-dispersive X-ray spectroscopy (EDS). The samples were analyzed at the University of Utah Geoscience Institute in Salt Lake City, Utah. The analysis included about 50 scanning electron micrographs as well as accompanying EDS analysis for each micrograph. The micrographs demonstrated removed particulates that had formed during the treatment and had collected on the surface of the membranes. "Marble like" solids were also present on the surface of the membranes. Additionally, biological contamination was also present on the micrographs. Rare earth metals were also detected on the surface of the microfiltration membrane. The rare earth metals were not embedded in the membrane, but only on the surface. The rare earth metals that were detected are shown in Table 7.

TABLE 7

| Element | Maximum % Weight | Number of Samples | Percent Occurrence |
|---|---|---|---|
| Lanthanum (La) | 2.35 | 1 | 1.96 |
| Cerium (Ce) | 4.84 | 1 | 1.96 |
| Neodymium (Nd) | 1.68 | 1 | 1.96 |
| Hafnium (Hf) | 0.45 | 2 | 3.92 |
| Bismuth (Bi) | 18.51 | 1 | 1.96 |
| Thorium (Th) | 0.990 | 1 | 1.96 |

After it became apparent that As, Se and U were not detectable in the filter cake, bright spots as detected by BSE (backscattering electron) containing a higher proportion of heavier elements were sought out and analyzed. These areas appeared to be both fine-grained amalgamations of material as well as larger grains collected by the membrane. Although no U, As or Se was detected in the analyses of these bright areas, other elements not observed in the filter cake such as Ti, Cr, Mn, Zr, Mo, La, Ce, Nd, Hf, Bi and Th were found in these phases, as illustrated in Table 8.

TABLE 8

| Element | Maximum % weight | Minimum % weight | Average % weight | Standard deviation | Number of samples | Percentage occurrence |
|---|---|---|---|---|---|---|
| Carbon, C | 20.85 | 4.42 | 11.93 | 4.6 | 51 | 100% |
| Oxygen, O | 57.7 | 17.63 | 42.87 | 9.18 | 51 | 100% |
| Sodium, Na | 11.15 | 1.04 | 5.32 | 2.54 | 51 | 100% |

TABLE 8-continued

| Element | Maximum % weight | Minimum % weight | Average % weight | Standard deviation | Number of samples | Percentage occurrence |
|---|---|---|---|---|---|---|
| Magnesium, Mg | 11.83 | 0.39 | 1.27 | 1.53 | 51 | 100% |
| Aluminum, Al | 2.44 | 0.47 | 1.04 | 0.34 | 51 | 100% |
| Silicon, Si | 27.4 | 0.68 | 2.51 | 4.23 | 51 | 100% |
| Sulfur, S | 16.61 | 0.88 | 3.24 | 3.28 | 51 | 100% |
| Chloride, Cl | 9.66 | 0.59 | 2.13 | 2.23 | 51 | 100% |
| Calcium, Ca | 29.52 | 3.98 | 10.35 | 5.62 | 51 | 100% |
| Iron, Fe | 57.54 | 0.65 | 15.03 | 16.57 | 51 | 100% |
| Potassium, K | 0.18 | 0.07 | 0.11 | 0.02 | 24 | 47.1% |
| Phosphorus, P | 2.84 | 0.11 | 0.50 | 0.82 | 13 | 25.5% |
| Manganese, Mn | 3.49 | 0.15 | 0.76 | 1.01 | 10 | 19.6% |
| Titanium, Ti | 14.8 | 14.8 | 14.8 | NA | 1 | 1.96% |
| Chromium, Cr | 13.34 | 0.14 | 5.515 | 5.58 | 4 | 7.84% |
| Zinc, Zn | 28.2 | 0.09 | 15.2 | 13.8 | 5 | 9.80% |
| Zirconium, Zr | 22.61 | 22.29 | 22.45 | 0.23 | 2 | 3.92% |
| Molybdenum, Mo | 16.0 | 16.0 | 16.0 | NA | 1 | 1.96% |
| Lanthanum, La | 2.35 | 2.35 | 2.35 | NA | 1 | 1.96% |
| Cerium, Ce | 4.84 | 4.84 | 4.84 | NA | 1 | 1.96% |
| Neodymium, Nd | 1.68 | 1.68 | 1.68 | NA | 1 | 1.96% |
| Hafnium, Hf | 0.45 | 0.43 | 0.44 | 0.01 | 2 | 3.92% |
| Bismuth, Bi | 18.51 | 18.51 | 18.51 | NA | 1 | 1.96% |
| Thorium, Th | 0.99 | 0.99 | 0.99 | NA | 1 | 1.96% |

Texturally distinct grains that appeared dark using the BSE detector were also analyzed for thoroughness. EDS data collected from these areas/grains contained no unusual elements and were often enriched in O, Si or Ca.

The effects of solids on the performance of the membranes were analyzed for each test run. Specifically, the flow through the membranes over time and at varying rates was analyzed. The flow was measured in GFD (gallons per square foot of membrane per day). The GFD was calculated at 665. This was lower than GFD values seen in some other previous tests using the same treatment processes for other types of impound water.

The data from Example 1 was reviewed for flow rates, heavy metals, organics, biologicals and other parameters. It was concluded that the conditions of the influent wastewater were likely tied to seasonal activity. It was possible that the conditions of the influent wastewater, including the presence of EPS, were linked to seasonal agricultural activity and that the presence of EPS was related to the use of anaerobically-processed waste in soil amendments used during the growing season. Previously tested samples from the non-growing season (October to February) did not contain EPS.

Example 2

A study was carried out near Corcoran, Calif. at the Tulare Lake Drainage District. The purpose of the study was to expand on the work that had been done in Example 1. The study was carried out in similar fashion to Example 1 with the noted exceptions. The influent water for the test runs of Example 2 were analyzed for turbidity and metals. The results are shown in Table 9.

TABLE 9

| — | Minimum | Mean | Maximum | Units |
|---|---|---|---|---|
| Total Dissolved Solids (TDS) | 8,620 | 126,289 | 21,100 | mg/L |
| Arsenic, As | 100 | 116 | 140 | µg/L |
| Selenium, Se | 30 | 49.7 | 120 | µg/L |
| Uranium, U | 510 | 558 | 657 | µg/L |
| Turbidity | 6.6 | 15.01 | 42.7 | NTU |
| pH | 8.05 | 8.75 | 9.18 | SU |

There was a visual increase in the presence of the EPS. There was also an increase in pH and an increase in TDS. It was decided that hydrochloric acid (HCl) would be added to reduce the pH. Test runs were performed at about pH 7 followed by test runs at about pH 6. The pH 7 test runs appeared to be more effective. The test runs were divided into two processes. Process 1 followed the protocol as described in Example 1 and Process 2 followed the modified protocol, including the step of adjusting pH with hydrochloric acid.

The Process 2 procedure resulted in effluent from the microfilter with less than 1.0 NTU and with a typical mean of 0.385 NTU. Process 2 flow rates exceeded 900 GFD and superseded the approximately 660 GFD flow rates achieved by Process 1. Process 2 also resulted in reduction in TDS of 14-25% over the total influent TDS values. Process 2 resulted in over 90% rejection of the influent ions (as measured in the microfiltration effluent). TDS values of the primary reverse osmosis effluent varied and in some cases ranged from 385 mg/L to 734 mg/L. Because the upper TDS regulatory limit was determined to be about 800 mg/L, in some cases a secondary reverse osmosis treatment was used to treat the primary reverse osmosis effluent to ensure TDS values below the regulatory limit.

The Process 2 procedure comprised one or more of the following steps:

Step 1: Providing influent impound water contaminated with EPS;

Step 2: Addition of ferric chloride to a final concentration of about 25 mg/L;

Step 3: Addition of hydrochloric acid (HCl) until a pH of about 7.0 was reached (about pH 6.75 to 7.25);

Step 4: Reaction with calcium oxide (CaO) or calcium hydroxide ($Ca(OH)_2$). Calcium oxide (CaO) or calcium hydroxide ($Ca(OH)_2$) was added until a pH of about 8.4 was reached (about pH 8.15 to 8.65);

Step 5: Reaction with aluminum chlorohydrate;

Step 6: Reaction with organic synthetic polymer such as epi-dma (poly(epichlorhydrin-dimethylamine));

Step 7: Low pressure, high flow rate microfiltration to remove filterable nontacky particles;

Step 8: Primary reverse osmosis filtration;

Step 9: Secondary reverse osmosis filtration;

Step 10: Thermal distillation of primary reverse osmosis reject and/or secondary reverse osmosis reject; and
Step 11: Discharge of treated water.

Samples from Process 1 and Process 2 were analyzed. These samples included samples of influent impound water, micro-filter effluent, and reverse osmosis permeate. The results of the analysis are shown in Tables, 10, 11, and 12, respectively.

TABLE 10

Influent impound water

| Parameter | Process 1 | Process 2 |
|---|---|---|
| Arsenic, As | 110 µg/L | 110 µg/L |
| Boron, B | 10,000 µg/L | 8,300 µg/L |
| Selenium, Se | * | 40.0 µg/L |
| Uranium, U | 400 µg/L | 510 µg/L |
| Uranium, U | 310 pCi/L | * |
| TDS | * | 15,100.0 mg/L |
| Conductivity | 21000 µS/M | 21000 µS/M |

* Analysis not performed

TABLE 11

Micro-filter effluent

| Parameter | Process 1 | Process 2 |
|---|---|---|
| Arsenic, As | 16.0 µg/L | 20 µg/L |
| Boron, B | 6,400 µg/L | 5,260 µg/L |
| Selenium, Se | * | <5.0 µg/L |
| Uranium, U | 400 µg/L | 390 µg/L |
| Uranium, U | 270 pCi/L | * |
| TDS | * | 9,510.0.0 mg/L |
| Conductivity | 1200 µS/M | * |

* Analysis not performed

TABLE 12

Reverse osmosis permeate

| Parameter | Process 1 | Process 2 |
|---|---|---|
| Arsenic, As | ** | <5.0 µg/L |
| Boron, B | 6,400 µg/L | 4,440 µg/L |
| Selenium, Se | * | <5.0 µg/L |
| Uranium, U | 5.9 µg/L | 12 µg/L |
| Uranium, U | 3.9 pCi/L | * |
| TDS | * | 734.0 mg/L |
| Conductivity | 1400 µS/M | * |

* Analysis not performed
** Below detectable limits

Analysis of the microfilter membranes by SEM and EDS indicated increased concentrations of biological matter and organic matter on the surface of the microfilter membranes with almost no penetration of the biological matter and organic matter into the interstitial space of the membrane. Flow rates through the membrane for Process 2 were also improved with flow rates at over 900 GFD and even over about 1000 GFD, compared to flow rates of about 660 GFD from Process 1. There was also a substantial decrease in turbidity and total dissolved solids using Process 2. In Process 2, influent TDS was over 15,000 mg/L and effluent from the microfilter was 9,500 mg/L. Analyzed samples from Process 1 and Process 2 had similar concentrations for uranium. It is possible that further processing with ion exchange could also be carried out to facilitate removal of the uranium.

Samples were taken from the surface of microfilter membranes to determine the amount and type of contaminants that were present on the microfilter surface. The analysis indicated that water comprised approximately 4-5% of the contaminants with the water likely bound as hydrates to other contaminants. Volatile solids comprised approximately 14% of the solid mass on the membrane. The volatile solids likely comprised organic compounds, biological compounds, herbicides, pesticides, and other similar compounds. The results of the analysis are shown in Table 13, below.

TABLE 13

| Contaminant | Concentration |
|---|---|
| Arsenic (As) (mg/kg) | 155 |
| Selenium (Se) (mg/kg) | 2.0 |
| Uranium (U) (mg/kg) | 192 |
| Total Solids (% by weight) | 96.4 |
| Volatile Solids (% by weight) | 14.0 |

The collected solids from Process 2 were also subjected to leachability testing. Leachability testing is a standard analysis performed to determine suitability for a waste material to be landfilled. The results are shown in Table 14. The results met and/or exceeded all TCLP (toxicity characteristic leaching procedure) parameters for landfill suitability.

TABLE 14

| TCLP Parameter | Phase 2 solids |
|---|---|
| Arsenic (As) (mg/kg) | <1.4 |
| Barium (Ba) (mg/kg) | <1.2 |
| Cadmium (Cd) (mg/kg) | <0.19 |
| Chromium (Cr) (mg/kg) | <0.86 |
| Lead (Pb) (mg/kg) | <0.37 |
| Mercury (Hg) (mg/kg) | <0.02 |
| Selenium (Se) (mg/kg) | <0.16 |
| Silver (Ag) (mg/kg) | <0.3 |

After the second phase of treatment testing another microfilter membrane was submitted to the University of Utah's Geological Institute in Salt Lake City, Utah to generate SEM and EDS data similar to that developed for the first phase. Although the TDS and contaminant load appeared to increase for the second testing phase, the expectation of the SEM and EDS data was that it would show similar particles and material concentrations. However, the data and images show a much different picture.

The biological load was dramatically more obvious and several types of whole organisms were present on the surface of the membranes. Additionally, there were no indications of the presence of rare elements present in the first phase of testing. The results are shown in Table 15.

TABLE 15

| Element | Maximum % weight | Minimum % weight | Average % weight | Standard deviation | Number of samples | Percentage occurrence |
|---|---|---|---|---|---|---|
| Carbon, C | 24.1 | 12.1 | 17.7 | 2.9 | 13 | 100 |
| Oxygen, O | 51.5 | 17.2 | 41 | 11 | 13 | 100 |
| Sodium, Na | 17.3 | 2.5 | 6.4 | 3.8 | 13 | 100 |

TABLE 15-continued

| Element | Maximum % weight | Minimum % weight | Average % weight | Standard deviation | Number of samples | Percentage occurrence |
|---|---|---|---|---|---|---|
| Magnesium, Mg | 1.5 | 0.4 | 1.0 | 0.4 | 13 | 100 |
| Aluminum, Al | 2.0 | 0.4 | 1.1 | 0.6 | 13 | 100 |
| Silicon, Si | 9.5 | 0.4 | 2.3 | 3.0 | 13 | 100 |
| Sulfur, S | 4.5 | 1.1 | 2.7 | 1.1 | 13 | 100 |
| Chloride, Cl | 21.3 | 1.3 | 4.8 | 5.2 | 13 | 100 |
| Calcium, Ca | 31.5 | 4.5 | 15.8 | 7.9 | 13 | 100 |
| Iron, Fe | 1.7 | 0.3 | 1.0 | 0.5 | 13 | 100 |
| Potassium, K | — | — | — | — | — | 0 |
| Phosphorus, P | 0.2 | 0.1 | 0.20 | 0.02 | 7 | 54 |
| Manganese, Mn | 0.7 | 0.2 | 0.3 | 0.1 | 10 | 77 |
| Titanium, Ti | — | — | — | — | — | 0 |
| Chromium, Cr | — | — | — | — | — | 0 |
| Zinc, Zn | — | — | — | — | — | 0 |
| Zirconium, Zr | — | — | — | — | — | 0 |
| Molybdenum, Mo | — | — | — | — | — | 0 |
| Lanthanum, La | — | — | — | — | — | 0 |
| Cerium, Ce | — | — | — | — | — | 0 |
| Neodymium, Nd | — | — | — | — | — | 0 |
| Hafnium, Hf | — | — | — | — | — | 0 |
| Bismuth, Bi | — | — | — | — | — | 0 |
| Thorium, Th | — | — | — | — | — | 0 |

Example 3

A study was carried out to calculate material balance from samples collected from influent impound water treated by Process 2 as described above in Example 2. One aspect of the study was to determine whether the TDS concentration of the treated water would comply with the regulatory limits for discharge to a California State Water Project (SWP) aqueduct. Another aspect of the study was to limit the TDS concentrations of treated effluent water to below 800 mg/L. The influent sample had a TDS concentration of 9,260 mg/L and pH of 8.38. The microfiltration effluent of the treated water had a TDS concentration of approximately 8,570 mg/L. To reduce the TDS concentrations to below the 800 mg/L cutoff, the microfiltration effluent was further treated by reverse osmosis. The reverse osmosis treatment was carried out by primary reverse osmosis followed by secondary reverse osmosis. A portion of the microfiltration effluent was diluted with primary reverse osmosis effluent and discharged. In some cases the primary reverse osmosis reject was further treated by a secondary reverse osmosis treatment and then discharged. It was determined that based on the approximate TDS concentrations, that the diluted discharge (microfiltration effluent diluted with primary reverse osmosis effluent) could contain no more than 5% microfiltration effluent. Based on the approximate TDS values, a diluted discharge of no more than 5% microfiltration effluent diluted with primary reverse osmosis effluent maintains the TDS of the diluted discharge at or below about 800 mg/L. Other dilutions of the microfiltration effluent were also possible to achieve specific final TDS concentrations of the diluted discharge. Other dilutions of the microfiltration effluent were also possible to comply with regulatory limits such as Maximum Concentration Limits (MCL) or other water quality standards such as those set out in State of California Title 22 Code of Regulations. The results are illustrated below in Table 16.

TABLE 16

| Contaminant | Influent Water | Microfiltration Effluent | Reverse osmosis Effluent |
|---|---|---|---|
| Total Dissolved Solids (TDS) | 9,260 mg/L | 8,570 mg/L | 392 mg/L |

TABLE 16-continued

| Contaminant | Influent Water | Microfiltration Effluent | Reverse osmosis Effluent |
|---|---|---|---|
| Total Suspended Solids (TSS) | 108 mg/L | <3 mg/L | <3 mg/L |

Inorganic contaminant levels were also analyzed in the influent impound water and the effluent treated water. The inorganic contaminant levels as compared to MCL are shown below in Table 17.

TABLE 17

| Inorganic Contaminant | Influent | Diluted Final Discharge | MCL |
|---|---|---|---|
| Aluminum, Al | 0.43 mg/L | <0.1 mg/L | 1 mg/L |
| Antimony, Sb | <0.1 mg/L | <0.1 mg/L | 0.006 mg/L |
| Arsenic, As | 0.140 mg/L | 4.2 mg/L | 0.01 mg/L |
| Asbestos | * | * | 7 MFL** |
| Barium, Ba | <0.05 mg/L | <0.05 mg/L | 1 mg/L |
| Beryllium, Be | <0.005 mg/L | <0.05 mg/L | 0.004 mg/L |
| Cadmium, Cd | <0.005 mg/L | <5.2 mg/L | 0.05 mg/L |
| Chromium, Cr | <0.05 mg/L | <0.05 mg/L | 0.05 mg/L |
| Cyanide, CN− | * | * | 0.15 mg/L |
| Fluoride, F | 1.0 mg/L | <0.1 mg/L | 2 mg/L |
| Mercury, Hg | * | * | 0.002 mg/L |
| Nickel, Ni | <0.02 mg/L | 0.011 mg/L | 0.1 mg/L |
| Nitrate, (as NO$_3$) | * | * | 45 mg/L |
| Nitrate + Nitrite (sum as N) | 18.2 mg/L | 6.5 mg/L | 10 mg/L |
| Nitrite (as N) | * | * | 1 mg/L |
| Perchlorate | * | * | 0.006 mg/L |
| Selenium, Se | 0.03 mg/L | <0.02 mg/L | 0.05 mg/L |
| Thallium, Tl | <0.1 mg/L | <0.1 mg/L | 0.002 mg/L |

* Analysis not performed
** Million Fibers per Liter

The levels of arsenic, selenium, and uranium were also analyzed in the influent impound water and the effluent treated water. The levels are illustrated in Table 18.

TABLE 18

| Contaminant | Influent Water | Microfiltration Effluent | Reverse osmosis Effluent |
|---|---|---|---|
| Arsenic, As | 110 µg/L | 36.5 µg/L | <5 µg/L |
| Selenium, Se | 30 µg/L | <20 µg/L | <20 µg/L |
| Uranium, U | 428 µg/L | 396 µg/L | <5 µg/L |

Water balance was also studied as part of the material balance study. The analysis was based on a desired flow rate of 11.4 million gallons of discharge water per day which was equivalent to approximately 7,918 gallons per minute. To achieve this discharge flow rate it was estimated that approximately 14.3 million gallons per day (equivalent to 9,925 gallon per minute) of influent impound water would need to be treated. A microfiltration effluent portion equivalent to 5% of the diluted discharge would be equivalent to about 395 gallons per minute with the remaining portion of the diluted discharge comprising about 7,523 gallons per minute of the reverse osmosis effluent. The final contaminant effluent wastewater stream would comprise the secondary reverse osmosis reject and be equivalent to about 1.9 million gallons per day. These estimates were based on the above determined contaminant levels. Other contaminant levels would potentially change these estimates.

The reverse osmosis portion of the system was also analyzed. It was estimated that the primary reverse osmosis system functions at about 70% efficiency, meaning that for every 100 gallons of wastewater entering the reverse osmosis system, about 70 gallons of effluent were generated and about 30 gallons of reject wastewater remained. The secondary reverse osmosis system or recovery reverse osmosis system, operated at a lower efficiency of about 50%. The secondary reverse osmosis system operated at higher pressures and lower flow rates. Considering both the primary and secondary reverse osmosis systems as a whole, it was estimated that total combined efficiency of the reverse osmosis system was about 85%. This meant that for every 100 gallons entering the combined reverse osmosis system, approximately 85 gallons of treated effluent were produced and about 15 gallons of TDS concentrated reject wastewater remained.

It was also estimated that in order to achieve a flow rate of about 7,523 gallons per minute of treated water for the diluted discharge with a combined reverse osmosis system efficiency of about 85%, that the reverse osmosis system would need an input stream of about 8,850 gallons per minute (or approximately 12.7 million gallons per day). At this rate, about 8,850 gallons per minute of microfiltration effluent would be input into the primary reverse osmosis system with the primary reverse osmosis system producing approximately 6,195 gallons per minute of permeate and about 2,655 gallons per minute of reject wastewater. The secondary reverse osmosis system would receive about 2,655 gallons per minute of reject wastewater from the primary reverse osmosis system and produce about 1,328 gallons per minute of permeate and generate a final reverse osmosis reject wastewater stream of about 1,328 gallons per minute. It was also estimated that the final diluted discharge blend would comprise about 5% microfiltration effluent, 78.2% primary reverse osmosis permeate, and about 16.8% secondary reverse osmosis permeate.

The influent wastewater and effluent treated water streams were analyzed for contaminant levels. The analytical results were used to perform computer simulated analysis of the contaminant levels with ROSA software (Reverse Osmosis System Analysis from Dow Chemical). The analysis indicated that the selection of reverse osmosis membranes configured for high rejection brackish water and high rejection salt water would permit even better results over the validation testing performed in Examples 1 and 2. The results are illustrated below in Table 19.

TABLE 19

| Contaminant | Microfiltration Effluent | Primary Reverse Osmosis Permeate | Secondary Reverse Osmosis Permeate | Diluted Discharge | Reverse Osmosis Reject |
|---|---|---|---|---|---|
| Total Dissolved Solids, TDS | 8,570 mg/L | 150.4 mg/L | 112.1 mg/L | 564.9 mg/L | 58,724 mg/L |
| Chloride, Cl | 1,640 mg/L | 32.31 mg/L | 34.59 mg/L | 113.1 mg/L | 10,968 mg/L |
| Sodium, Na | 2,910 mg/L | 41.89 mg/L | 31.87 mg/L | 183.6 mg/L | 17,196 mg/L |
| Sulfate, $SO_4$ | 3,640 mg/L | 33.81 mg/L | 11.46 mg/L | 210.4 mg/L | 24,593 mg/L |
| Arsenic, As | 0.036 mg/L | 0.0 mg/L | 0.0 mg/L | 0.0 mg/L | 0.240 mg/L |
| Barium, Ba | 25 µg/L | 0 µg/L | 0 µg/L | 1.3 µg/L | 166.6 µg/L |
| Boron, B | 5,350 µg/L | 2,810 µg/L | 2,640 µg/L | 2,908 µg/L | 35,652 µg/L |
| Silicon, Si | 14,100 µg/L | 210 µg/L | 1,040 µg/L | 1,044 µg/L | 93,962 µg/L |
| Strontium, Sr | 1,370 µg/L | 10 µg/L | 0 µg/L | 76 µg/L | 9,130 µg/L |
| Uranium, U | 420 µg/L | 0 µg/L | 0 µg/L | 21 µg/L | 2,799 µg/L |

The secondary reverse osmosis salt reject stream was also analyzed. The estimated 1,328 gallons per minute of the concentrated secondary reverse osmosis salt reject stream comprised the only wastewater stream from the water treatment system. One method of further processing was discharge of the concentrated secondary reverse osmosis salt reject stream to a segregated evaporation basin. However, considering the 1,328 gallons per minute salt reject stream would result in 1.9 million gallons per day of salt reject, other methods of further processing were considered. One method of further processing that was considered was thermal-fractional distillation. Thermal-fractional distillation would be able to reduce the 1.9 million gallons per day of salt reject to approximately 380,000 gallons per day (an approximate 80% reduction by volume) of semi-solid slurry suitable for further evaporation, landfill disposal, or use and/or sale as a product for industrial and commercial applications. Thermal-fractional distillation would be able to also produce additional purified water product for blending and discharge. The use of thermal-fractional distillation would also increase the overall efficiency of the system to about 97% and eliminate wastewater discharge (resulting in ZLD, zero liquid discharge).

A potential salt slurry solution resulting from thermal-fractional distillation treatment of the above secondary reverse osmosis salt reject stream was considered. The TDS concentration of the potential salt slurry solution was expected to be about 285 g/L. It was estimated that the potential salt slurry solution was expected to comprise about 40% insoluble solids capable of removal by standard solids removal system such as plate and frame filter press. The remaining soluble liquid fraction was expected to comprise about 165 g/L of soluble salts and the soluble liquid fraction was expected to be capable of being returned to the fractional distillation column or capable of being diluted and discharged.

The microfiltration system was also analyzed. It was estimated that the microfiltration system flow rate was expected to be about 9,245 gallons per minute to achieve the total diluted discharge flow rate. The microfiltration system received chemically treated influent water and passed it through microfiltration membranes. The microfiltration system also used regular back-flush cycles to flush non-tacky filterable particles from the microfiltration membranes. In some instances the chemically treated influent water was passed through the microfiltration membrane in 20 to 22 minute cycles and then back-flushed for 1 minute. The water used for the back-flush was returned to the front end of the water treatment system for chemical treatment. It was estimated that the flow rate of the back-flush water would average approximately 30 gallons per minute over a 24 hour period. It was also estimated that the liquid/solid slurry that would be removed from the bottom of the microfiltration system would feed the solids separation system at an estimated rate of 650 gallons per minute.

There were only minimal losses of water at the microfiltration step because all of the influent wastewater was chemically treated and then passed through the microfiltration system. The minimal losses of water were due at least in part to water associated with the liquid/solid slurry removed from the bottom of the microfiltration system. The liquid/solid slurry that was collected from the back-flushing of the microfiltration membranes was pumped to a solids holding/thickening tank for further processing by a plate and frame filter press or by centrifugation. The semi-solid cake that was segregated from this holding tank was greater than 25% solid material. The effluent water from the further processing by the plate and frame filter press or by centrifugation was likely free of suspended particles but likely had the potential to contain other contaminants that would be removed by the subsequent reverse osmosis system. The influent wastewater and effluent treated water streams were analyzed for contaminant levels. The results are illustrated below in Table 20.

TABLE 20

| Contaminant | Influent | Micro-filtration Effluent | Reverse Osmosis Permeate |
|---|---|---|---|
| Total Dissolved Solids | 9,260 mg/L | 8,570 mg/L | 392.0 mg/L |
| Total Suspended Solids | 108 mg/L | <3 mg/L | <2 mg/L |
| Total Organic Carbon | <26.9 mg/L | 10.6 mg/L | 3.0 mg/L |
| Nitrogen, Total Kjeldahl (TKN) | 5.5 mg/L | 1.65 mg/L | 0.310 mg/L |
| Arsenic, As | 0.110 µg/L | 0.036 µg/L | <0.005 µg/L |
| Barium, Ba | <50 µg/L | <50 µg/L | <0.005 µg/L |
| Boron, B | 5,530 µg/L | 5,350 µg/L | 4,870 µg/L |
| Chromium, Cr | <50 µg/L | <50 µg/L | 0 µg/L |
| Lead, Pb | <50 µg/L | <50 µg/L | 0 µg/L |
| Selenium, Se | 30 µg/L | <20 µg/L | 0 µg/L |
| Silicon, Si | 10,900 µg/L | 14,100 µg/L | 720 µg/L |

TABLE 20-continued

| Contaminant | Influent | Micro-filtration Effluent | Reverse Osmosis Permeate |
|---|---|---|---|
| Strontium, Sr | 2,230 µg/L | 1,370 µg/L | <10 µg/L |
| Uranium, U | 428 µg/L | 396 µg/L | <5 µg/L |

The solids balance was also studied as part of the materials balance study. The liquid/solid slurry removed from the bottom of the microfiltration system was estimated to be about 5% total solids. Subsequent processing by plate and frame filter press and/or centrifugation concentrated this liquid/solid slurry into a semi-solid cake of approximately 30-50% total solids material and nearly particle free liquid. The liquid/solids slurry flowed at approximately 650 gallons per minute from the bottom of the microfiltration system and processing by plate and frame filter press and/or centrifugation resulted in a nearly particle free liquid stream at approximately 585 gallons per minute and a semi-solid cake stream at approximately 65 gallons per minute. The nearly particle free liquid stream was directed to the front end of the treatment system and combined with raw influent water that entered the chemical treatment step.

Semi-solid cake was collected with a plate and frame filter press and analyzed. The semi-solid cake was generated at a rate of 1.1014 grams per gallon of raw influent water that was chemically treated. The volume of raw influent water was calculated as the total volume of wastewater that entered the system and did not include the flow from the back-flush cycles or the flow returned from the solids separation step. On the basis of the total volume of raw influent, the solids generations was calculated to be approximately 16.3 tons of wet-weight solids per day. Based on the amount of wet-weight solids generated per day, the primary solids management plan did not include landfill disposal as the initial method for solid waste disposal. The primary solids management plan included recycling as a means for disposal of the generated solids with landfill disposal as a secondary or supplemental option.

The wet-weight solids were analyzed. The results appear in Table 21 below.

TABLE 21

| Contaminant | Influent | Micro-filtration Effluent | Wet semi-solids |
|---|---|---|---|
| Total Solids | 9,368 mg/L | 8,571 mg/L | 53.4% by weight |
| Arsenic, As | 110 82 g/L | 37 µg/L | 67.8 mg/kg |
| Selenium, Se | 30 µg/L | 20 µg/L | 1.7 mg/kg |
| Uranium, U | 428 µg/L | 396 µg/L | 129 mg/kg |

The percentage of the semi-solid cake that was solid material was determined to be 53.4% of the total weight. This percentage of solid material in the semi-solid cake was then used to calculate the approximate dry solid weight of a scaled-up full production run as approximately 8.7 tons per day. Further testing showed that heat drying was able to achieve a residual dry solid of approximately 95% total solids by weight. The remaining 5% of total weight not attributable to dry solid was likely bound water. Drying to the level of 95% total solids by weight was calculated to result in 9.135 tons of solid waste per day for a full scale operation. However, it was determined that achieving this maximum level of dryness (95% dry solids) was difficult because the water concentration in the semi-solid cake decreases, the incremental cost of removing the remaining water increases to a point of diminishing return. It was determined that a reasonable value for total solids concentration was approximately 65% to 75% total solids. It was calculated that drying the semi-solid cake at the approximately 65% to 75% total solids range would generate approximately 13 tons of solid waste per day.

Lastly, a materials balance summary was prepared for the liquid and solid effluent generated from all the steps of the wastewater treatment process. The influent water 200 from the TLDD impound water entered the system at a rate of 9,310 gal/min for a total of 13.4 million gallons per day. The microfiltration step 400 produced effluent water at a flow rate of 9,245 gal/min. to make up the blended discharge to the aqueduct system of about 11.4 million gallons per day (MGD). About 16.3 tons of wet semi-solid waste was generated per day. The combined primary and secondary reverse osmosis steps achieved about 85% recovery of permeate quality water. The reverse osmosis step generated over 1.9 MGD of rejected salt solution that was discharged to a segregated evaporation basin. The blended discharge to the aqueduct system comprised 395 gallons per minute (gpm) (1.14 MGD) of microfiltration effluent (with TDS<8,600 mg/L) and 7,523 gpm of combined effluent from the primary and secondary reverse osmosis step (with TDS<400 mg/L). The total volume of the treated water effluent streams was 7,918 gpm (11.4 MGD) with TDS≤800 mg/L. It was determined that losses of water to the environment due to evaporation would be negligible and that these losses would not affect the overall system balance.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

The invention claimed is:

1. A method for reducing biofouling of microfiltration membranes by a biomolecule-based exopolymeric substance, the method comprising:
   providing impound water comprising a biomolecule-based exopolymeric substance;
   reacting the impound water with calcium oxide or calcium hydroxide to generate a calcium-treated biomolecule-based exopolymeric substance mixture;
   encapsulating the reacted biomolecule-based exopolymeric substance into filterable, non-tacky particles by reacting the calcium-treated biomolecule-based exopolymeric substance mixture with an aluminum-based inorganic coagulant and a cationic polymer having a molecular weight in the range from about 200,000 to about 800,000 Daltons (Da) having a molecular weight in the range from 200,000 to 800,000 Da;
   removing a first portion of the encapsulated biomolecule-based exopolymeric substance as bulk solid; and
   removing a second portion of the encapsulated biomolecule-based exopolymeric substance by low pressure microfiltration through a microfiltration membrane comprising a pore size of between about 0.7 to 12 microns,
   wherein encapsulating the biomolecule-based exopolymeric substance into filterable, non-tacky particles reduces biofouling of the microfiltration membrane.

2. The method of claim 1, wherein the calcium oxide or calcium hydroxide is reacted at a final concentration of between about 100 mg/L to 225 mg/L.

3. The method of claim 1, wherein the inorganic coagulant comprises aluminum chlorohydrate.

4. The method of claim 3, wherein the aluminum chlorohydrate is reacted at a final concentration of about 25 mg/L to 75 mg/L.

5. The method of claim 1, wherein the cationic polymer comprises epi-dma (poly(epichlorhydrin-dimethylamine).

6. The method of claim 1, wherein the inorganic coagulant and cationic polymer are reacted with the calcium-treated biomolecule-based exopolymeric substance mixture at a ratio of coagulant to polymer of about 1:1 to 10:1.

7. The method of claim 1, wherein the microfiltration membrane comprises polypropylene, polysulfone, polyethylene, polytetrafluoroethylene, or combinations thereof.

8. The method of claim 1, wherein the microfiltration membrane comprises a pore size between about 1 to 2.5 microns.

9. The method of claim 1, wherein microfiltering further comprises:
microfiltering with a microfilter membrane at a back pressure of less than about 15 pounds per square inch and at a flow rate of at least 650 gallons per square foot of microfilter membrane per day; and
periodically backwashing the microfilter membrane to remove collected filterable non-tacky particles.

10. A method for removing polysaccharide-based exopolymeric substance from an aqueous mixture, the method comprising:
providing an aqueous mixture, the aqueous mixture containing exopolymeric substance and one or more of dissolved solids, suspended solids or heavy metals;
reacting the aqueous mixture with calcium oxide or calcium hydroxide to generate a calcium-treated mixture;
encapsulating the reacted polysaccharide-based exopolymeric substance into filterable, non-tacky particles by reacting the calcium-treated mixture with aluminum chlorohydrate and epi-dma (poly(epichlorhydrin-dimethylamine);
mechanically removing a first portion of the encapsulated polysaccharide-based exopolymeric substance as bulk solid; and
microfiltering to remove a second portion of the encapsulated polysaccharide-based exopolymeric substance.

11. The method of claim 10, wherein microfiltering further comprises:
microfiltering with a microfilter membrane at a back pressure of less than about 15 pounds per square inch and at a flow rate of at least 650 gallons per square foot of microfilter membrane per day; and
periodically backwashing the microfilter membrane to remove collected filterable non-tacky particles.

12. The method of claim 10, further comprising microfiltering with a microfilter membrane comprising polypropylene, polysulfone, polyethylene, polytetrafluoroethylene, or combinations thereof.

13. The method of claim 11, wherein the microfilter membrane comprises a pore size between about 0.7 and about 12 microns.

14. The method of claim 11, wherein the microfilter membrane comprises a pore size between about 1 to 2.5 microns.

* * * * *